Aug. 4, 1953 R. LEDUC 2,647,369
COMBUSTION CHAMBER FOR FLUID FUEL BURNING
IN AN AIR STREAM OF HIGH VELOCITY
Filed Feb. 12, 1948 3 Sheets-Sheet 1
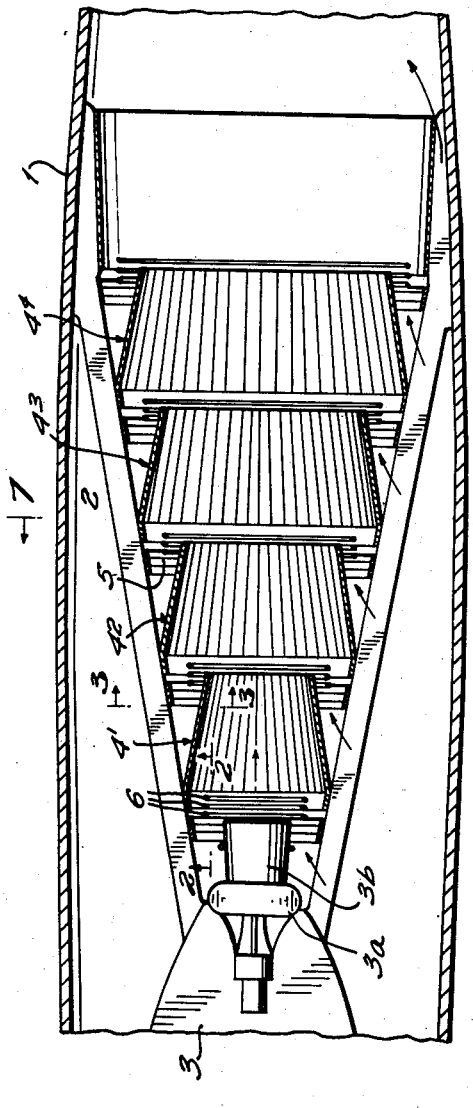
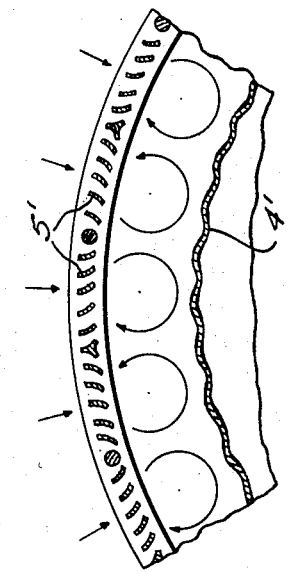
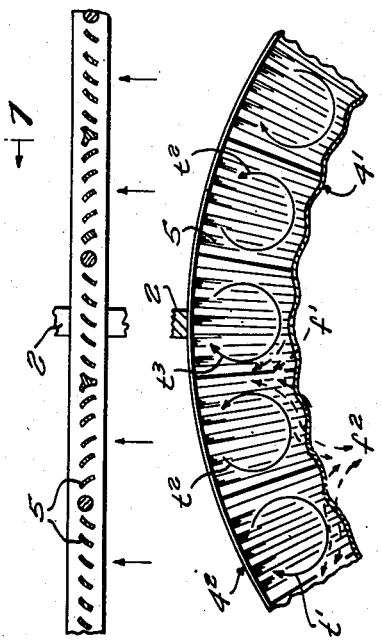
INVENTOR.
RENÉ LEDUC
BY

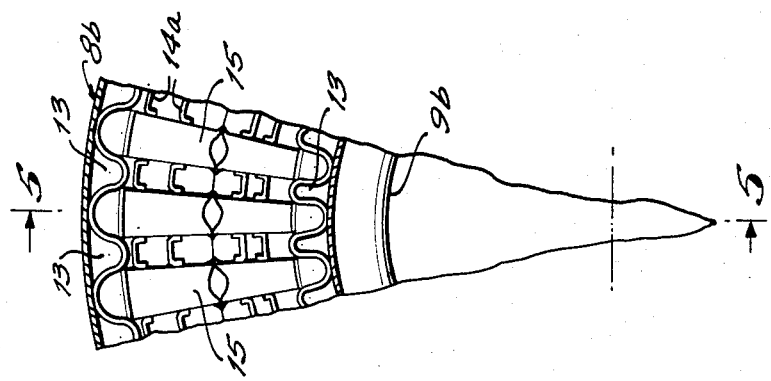
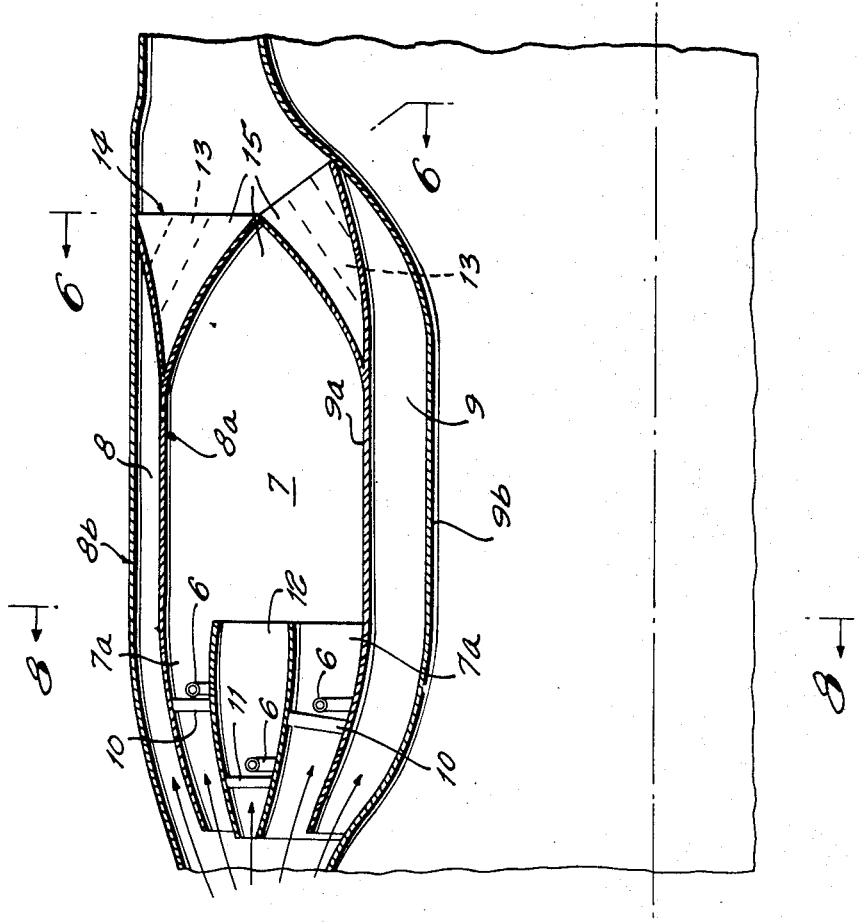

Aug. 4, 1953 R. LEDUC 2,647,369
COMBUSTION CHAMBER FOR FLUID FUEL BURNING
IN AN AIR STREAM OF HIGH VELOCITY
Filed Feb. 12, 1948 3 Sheets-Sheet 3

INVENTOR.
RENÉ LEDUC
BY

UNITED STATES PATENT OFFICE 2,647,369

COMBUSTION CHAMBER FOR FLUID FUEL BURNING IN AIR STREAM OF HIGH VELOCITY

René Leduc, Toulouse, France

Application February 12, 1948, Serial No. 7,768
In France September 6, 1946

Section 1, Public Law 690, August 8, 1946
Patent expires September 6, 1966

13 Claims. (Cl. 60—39.36)

This invention relates to combustion chambers for burning fluid fuel in a high velocity airstream, for incorporation in gas-operated heat engines of the class comprising ram-jets and gas-turbine engines.

The general object of the invention is the provision of a combustion chamber for these purposes giving a high efficiency of combustion through the chamber.

The particular objects of the invention include the disposition of elements within the combustion chamber in such a way as to reduce the air velocity in the neighborhood of the burners sufficiently to ensure that the flame or flames will not be extinguished by reason of the air supply reaching the burners with a velocity exceeding that of flame propagation; the disposition of these elements so as to provide a continuous layer or jacket of cooling air next the outer wall of the combustion chamber and an unobstructed central region continuous throughout the length of the combustion chamber which receives the heated air and products of combustion from the flame-zones and conveys them to the outlet of the combustion chamber. The objects of the invention also include the provision of improved means of supporting and feeding the fuel burners in association with baffle elements defining the flame-zones or auxiliary flame chambers and the incorporation in the entries of these auxiliary flame chambers of improved means for creating turbulence in the neighbourhood of the flames, thus promoting the intimate mixture of the primary air with the fuel which is conducive to efficient and complete combustion, without introducing a general swirl of the working fluid around the central axis of the combustion chamber.

Another object of the invention is the combination of an improved combustion chamber having the desirable qualities above referred to with means for supplying additional heat to the working fluid, and particularly to the combination with an auxiliary turbine whose exhaust is discharged into the central space of the combustion chamber, thus providing a core of hot gases, part at least of whose heat is transferred, mainly by radiation, to the combustion air, thus preheating the latter.

Yet another object of the invention is the provision of improved means for controlling the fuel supply to a combustion chamber for the purposes hereinbefore mentioned. The objects of the invention further include an improved annular combustion chamber particularly applicable to incorporation in a gas-turbine engine having internal annular partitions disposed to provide inner and outer annular streams of cooling air next the inner and outer walls of the chamber and to promote intimate mixture at the outlet of the combustion chamber of this cooling air with the heated air and products of combustion issuing from the flame-zone.

How these several objects are achieved, and others as will hereinafter appear, will be more fully understood from the following description of two specific embodiments of the invention with reference to the accompanying drawings, given by way of example only. In the drawings:

Figure 1 is a diagrammatic view in axial section of a combustion chamber for an aerothermodynamic duct.

Figure 2 is a cylindrical section taken along the line 2—2 of Figure 1 and developed;

Figure 3 is a radial section along the line 3—3 of Figure 1.

Figure 4 is likewise a section along the line 3—3 showing a modification.

Figure 5 is a diagrammatic view in axial section of one half of an annular combustion chamber for a gas turbine engine along the line 5—5 of Figure 6.

Figure 6 is a partial section of the combustion chamber along the line 6—6 of Figure 5.

Referring to Figures 1-4 and 7, the duct comprises an external wall 1 in the form of a surface of revolution from which are supported, by means of a number of faired brackets 2, a number of annular partitions or baffles $4^1$, $4^2$, $4^3$, $4^4$, forming the boundaries of a series of annular flame chambers. The brackets 2 also support on their leading end a central compartment 3 which may contain a cabin or control station or/and auxiliary machinery.

The partitions $4^1$, $4^2$, $4^3$, $4^4$ are coaxial with the duct and are spaced from one another in succession along the axis. They are of divergent-convergent form as shown, and their mean diameters increase in the downstream direction with respect to the diameter of other partitions; and the convergent trailing end of each partition is nested within the divergent leading end of the next partition in the downstream direction so as to define an annular flame chamber of increasing cross-section in the downstream direction, within which is arranged a number of fuel-feeding-ring-manifolds 6 carrying circumferentially spaced fuel burners.

Figure 7:
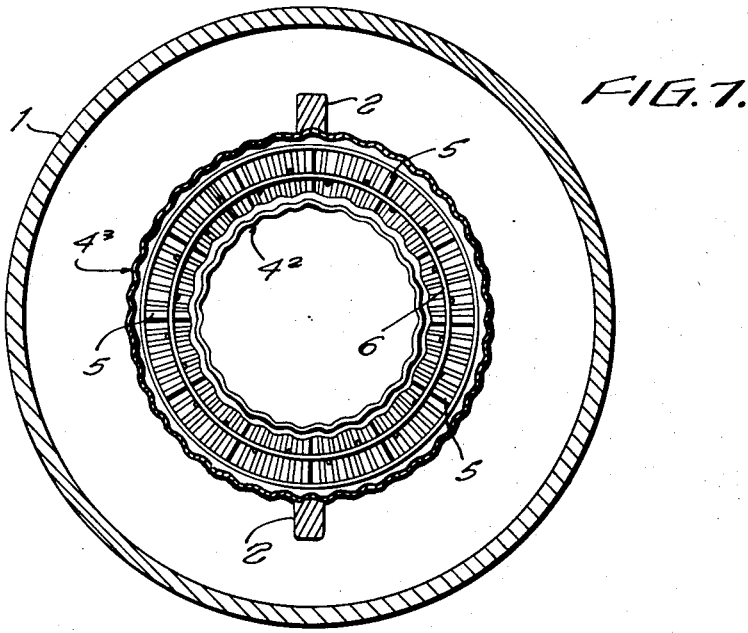
Figure 7 is a sectional view taken along the line 7—7 of Fig. 1 in the direction of the arrows.

Preferably, the partitions $4^1$, $4^2$, $4^3$, $4^4$, are pleated longitudinally, as shown in Fig. 7.

Between the partitions $4^1$, $4^2$, $4^3$, $4^4$, and the outer wall 1 of the chamber is a continuous annular air space, the air flow through which serves to cool the outer wall and to feed primary combustion air into the flame chamber through their annular entries defined by the leading edge of each partition $4^1$, $4^2$, $4^3$, $4^4$ and the skirt or trailing portion of the partition next upstream of it. These entries are provided with rings of inclined guide-vanes 5 arranged in groups of vanes of right- and left-handed inclination alternating circumferentially. These guide-vanes are formed as elongated members as shown in Fig. 3 and the longitudinal directions thereof may either be radially disposed as shown in Figures 2 and 3 or parallel to the axis of the duct as shown in Figure 4 showing one of the partitions, say 4' and the guide-vanes 5' arranged parallel to the axis (not shown in Fig. 4). These inclined guide-vanes arranged in alternating groups of opposed inclination generate vortex filaments which degrade into an annular sheet of small helicoidal vortices, each corresponding to one group of vanes, mutually adjacent vortices being of opposed hand as shown by the arrows $t^1$, $t^2$ of Figure 3, giving rise to air currents of alternating direction as shown by the arrows $f^1$, $f^2$ of Figure 3. This gives rise to a high degree of turbulence in the immediate neighborhood of the burner carried by the ring-manifolds 6, thus promoting efficient combustion.

It will be seen that the annular flame chamber defined by the leading portion of the foremost partition $4^1$ has no inner boundary properly speaking but the inner boundary of its entry is defined by the exhaust pipe 3b of an auxiliary turbine generally indicated at 3a which is mounted at the rear end of the compartment 3 and which may serve to provide power for various auxiliary services housed in compartment 3. The exhaust 3b of this turbine furnishes the combustion chamber with a core of hot gases whose temperature may be from 400° C. to 500° C. and whose heat content in addition to contributing to the total heat input of the apparatus is in part at least transferred, mainly by radiation, to the air entering the flame-chambers, thus promoting efficient combustion.

Combustion efficiency and shortness of flame is also promoted by the shape of the flame chambers themselves, which, being of increasing cross-section in the downstream direction, act as diffusers and retard the air flow past the burners.

Finally, it will be noticed that the arrangements illustrated, in which a large number of short flame-chambers disposed in succession along the length of the duct is used, enables a considerable proportion of the total length of the duct to be utilised for combustion.

Figure 8:
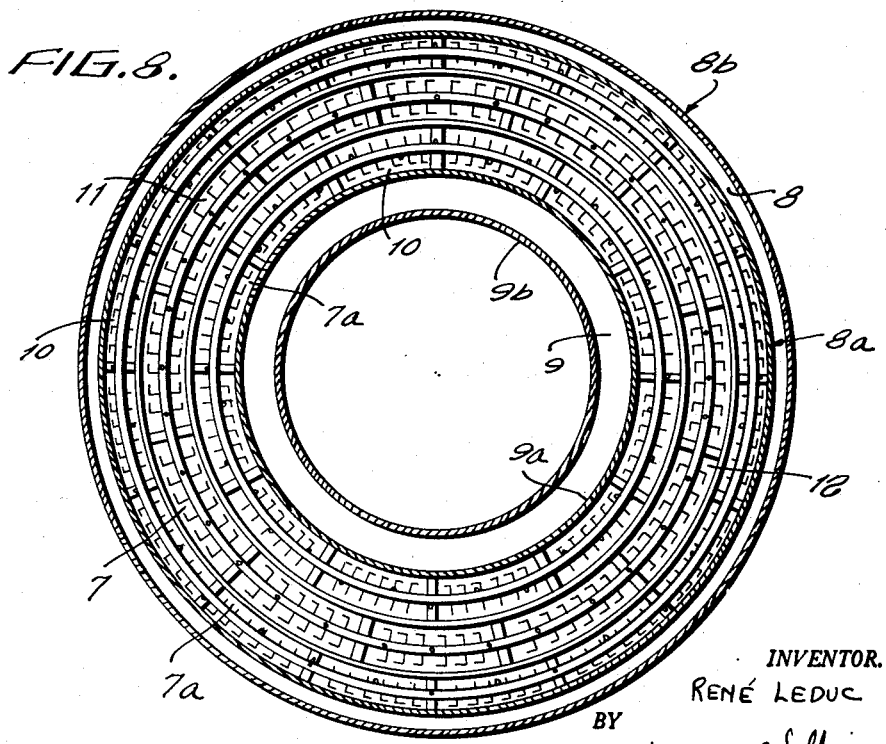
Fig. 8 is a sectional view taken along line 8—8 of Fig. 5 in the direction of the arrows and showing the structure of Fig. 5 about its entire circumference.

Figures 5, 6 and 8 illustrate a different form of combustion chamber for a gas-turbine engine. In this an annular flame-chamber 7 is bounded by annular partitions 8a, 9a separating it from an outer annular air space 8 and an inner annular air space 9 enclosed respectively by outer and innner annular walls 8b, 9b. The inlet end of the flame-chamber 7 is further sub-divided by internal partitions 12a into outer auxiliary flame-chambers or tubes 7a and a central auxiliary flame-chamber or tube 12. The inlets of all these auxiliary flame-chambers are provided with radially disposed guide vanes 10, 11, arranged in alternating groups of opposed handed vanes in the manner shown in Figures 2 and 3. The annular passages 8, 9, carry streams of cooling air which have to be intimately mixed with the products of combustion from the flame-chamber 7 before leaving the combustion chamber. To promote this intimate mixture the partitions 8a, 9a enclosing the flame-chamber 7 are formed at their outlet end with radial pleats increasing in depth in the downstream direction until the pleats of the outer partition 8a meet those of the innner partition 9a. The sides of these pleats form radial partitions 14 which subdivide the outlet end of the combustion chamber into radial ducts 13 conveying streams of air alternating circumferentially with radial ducts 15 conveying streams of burnt or nearly burnt gases, thus stratifying the combustion chamber efflux into circumfurentially alternating radial layers of air and burnt or nearly burnt gases respectively. The radial air ducts 13 may be further subdivided by means of inclined sub-partitions 14a which also serve as stays for the radial partitions 14 formed by the sides of the pleats of partitions 8a, 9a.

I claim:

1. A combustion chamber for fluid fuel burning in an air stream of high velocity comprising in combination, a tubular outer wall; a plurality of annular baffles coaxially arranged with respect to said outer wall and forming a plurality of coaxial open-ended chambers; fuel burners arranged in said chambers; and guide vanes arranged at the entries of said chambers, said guide vanes being arranged in groups having right and left handed inclinations alternating circumferentially.

2. A combination chamber for fluid fuel burning in an air stream of high velocity comprising in combination, a tubular outer wall; a plurality of annular baffles coaxially arranged with respect to said outer wall and forming a plurality of coaxial open-ended chambers; fuel burners arranged in said chambers; a continuous annular space formed by said outer wall and at least one of said baffles, said continuous annular space being adapted to be traversed by a stream of cooling air; and guide vanes arranged at the entries of said chambers, said guide vanes being arranged in groups having right and left handed inclinations alternating circumferentially.

3. A combustion chamber for fluid fuel burning in an air stream of high velocity comprising in combination, a tubular outer wall; a plurality of annular baffles coaxially arranged with respect to said outer wall and overlapping one another successively in axial direction, said annular baffles forming a plurality of coaxial open-ended chambers, said chambers overlapping one another successively in axial direction; fuel burners arranged in said chambers; a continuous annular space formed by said outer wall and at least one of said baffles, said continuous annular space being adapted to be traversed by a stream of cooling air; and guide vanes arranged at the entries of said chambers, said guide vanes being arranged in groups having right and left handed inclinations alternating circumferentially.

4. A combustion chamber for fluid fuel burning in an air stream of high velocity comprising in combination, a tubular outer wall; a plurality of annular baffles coaxially arranged with respect to said outer wall and forming a plurality of coaxial open-ended chambers; fuel burners arranged in said chambers; a continuous annular space formed by said outer wall and at least one of said baffles, said continuous annular space being adapted to be traversed by a stream of cooling air, said chambers being arranged in communication through their upstream ends with said continuous annular space; and guide vanes arranged at the entries of said chambers, said guide vanes being arranged in groups having right and left handed inclinations alternating circumferentially.

5. A combustion chamber for fluid fuel burning in an air stream of high velocity comprising in combination, an outer wall having the form of a surface of revolution; a plurality of coaxial annular partitions having a divergent-convergent form and being arranged in said outer wall in succession in the axial direction thereof, said partitions having a mean diameter successively increasing in the downstream direction and being arranged to overlap one another; the convergent trailing part of each of said annular partitions and the divergent leading part of the succeeding partition forming a chamber having an increasing cross-section in downstream direction; fuel burners in said chambers; and guide vanes arranged at the entries of said chambers, said guide vanes being arranged in groups having right and left handed inclinations alternating circumferentially.

6. A combustion chamber for fluid fuel burning in an air stream of high velocity comprising in combination, an outer wall having the form of a surface of revolution; a plurality of coaxial annular partitions having a divergent-convergent form and being arranged in said outer wall in succession in the axial direction thereof, said partitions having a mean diameter successively increasing in the downstream direction and being arranged to overlap one another, the convergent trailing part of each of said annular partitions and the divergent leading part of the succeeding partition forming a chamber having an increasing cross-section in downstream direction; fuel burners in said chambers; a continuous annular air space formed by said outer wall and said partitions; and guide vanes arranged at the entries of said chambers, said guide vanes being arranged in groups having right and left handed inclinations alternating circumferentially.

7. A combustion chamber for fluid fuel burning in an air stream of high velocity comprising in combination, an outer wall having the form of a surface of revolution; a plurality of coaxial annular partitions having a divergent-convergent form and being arranged in said outer wall in succession in the axial direction thereof, said partitions having a mean diameter successively increasing in the downstream direction and being arranged to overlap one another, the convergent trailing part of each of said annular partitions and the divergent leading part of the succeeding partition forming a chamber having an increasing cross-section in downstream direction; fuel burners in said chambers; a continuous annular air space formed by said outer wall and said partitions; a continuous central space inside said partitions; and guide vanes arranged at the entries of said chambers, said guide vanes being arranged in groups having right and left handed inclinations alternating circumferentially.

8. A combustion chamber for fluid fuel burning in an air stream of high velocity comprising in combination, an outer wall having the form of a surface of revolution; a plurality of coaxial annular partitions having a divergent convergent form and being arranged in said outer wall in succession in the axial direction thereof, said partitions being longitudinally pleated and having a mean diameter successively increasing in the downstream direction and being arranged to overlap one another, the convergent trailing part of each of said annular partitions and the divergent leading part of the succeeding partition forming a chamber having an increasing cross-section in downstream direction; fuel burners in said chambers; and guide vanes arranged at the entries of said chambers, said guide vanes being arranged in groups having right and left handed inclinations alternating circumferentially.

9. A combustion chamber for fluid fuel burning in an air stream of high velocity comprising in combination, an outer wall having the form of a surface of revolution; a plurality of coaxial annular partitions having a divergent-convergent form and being arranged in said outer wall in succession in the axial direction thereof, said partitions having a mean diameter successively increasing in the downstream direction and being arranged to overlap one another, the convergent trailing part of each of said annular partitions and the divergent leading part of the succeeding partition forming a chamber having an increasing cross-section in downstream direction; a fuel-feeding ring-shaped manifold in each of said chambers; burners mounted on and circumferentially spaced around said manifolds; and guide vanes arranged at the entries of said chambers, said guide vanes being arranged in groups having right and left handed inclinations alternating circumferentially.

10. A combustion chamber for fluid fuel burning in an air stream of high velocity comprising in combination, a tubular outer wall; a plurality of annular baffles coaxially arranged with respect to said outer wall and forming a plurality of coaxial open-ended chambers; fuel burners arranged in said chambers; and guide vanes arranged at the entries of said chambers, said guide vanes being formed as elongated members arranged in groups having right and left handed inclinations alternating circumferentially, the longitudinal directions of said elongated members forming said guide vanes being arranged radially with respect to the axis of said chambers.

11. A combustion chamber for fluid fuel burning in an air stream of high velocity comprising in combination, a tubular outer wall; a plurality of annular baffles coaxially arranged with respect to said outer wall and forming a plurality of coaxial open-ended chambers; fuel burners arranged in said chambers; and guide vanes arranged at the entries of said chambers, said guide vanes being formed as elongated members arranged in groups having right and left handed inclinations alternating circumferentially, the longitudinal directions of said elongated members forming said guide vanes being substantially parallel to the axis of said chamber.

12. A combustion chamber for fluid fuel burning in an air stream of high velocity comprising in combination, a tubular outer wall; a plurality of annular baffles coaxially arranged with respect to said outer wall and forming a plurality of coaxial open-ended chambers; fuel burners arranged in said chambers; guide vanes arranged at the entries of said chambers, said guide vanes being arranged in groups having right and left handed inclinations alternating circumferentially; and means for supplying heat to said combustion chamber in addition to the heat supplied by the burning of the fuel in said chambers so as to heat the air entering said chambers.

13. A combustion chamber for fluid fuel burning in an air stream of high velocity comprising in combination, an outer wall having the form of a surface of revolution; a plurality of coaxial annular partitions having a divergent-convergent form and being arranged in said outer wall in succession in the axial direction thereof; said partitions having a mean diameter successively increasing in the downstream direction and being arranged to overlap one another, the convergent trailing part of each of said annular partitions and the divergent leading part of the succeeding partition forming a chamber having an increasing cross-section in downstream direction; fuel burners in said chambers; guide vanes arranged at the entries of said chambers, said guide vanes being arranged in groups having right and left handed inclinations alternating circumferentially; an auxiliary turbine; and an exhaust pipe of said auxiliary turbine; said exhaust pipe being arranged centrally at the leading end of the leading one of said chambers and discharging axially thereof in downstream direction, the entry of the leading one of said chambers being defined by the leading edge of the leading one of said partitions and said exhaust pipe of said auxiliary turbine.

RENÉ LEDUC.

References Cited in the file of this patent

UNITED STATES PATENTS

| Number | Name | Date |
|---|---|---|
| 2,396,911 | Anxionnaz | Mar. 19, 1946 |
| 2,404,335 | Whittle | July 16, 1946 |
| 2,417,445 | Pinkel | Mar. 18, 1947 |
| 2,448,561 | Way | Sept. 7, 1948 |
| 2,448,562 | Way | Sept. 7, 1948 |
| 2,477,583 | De Zubay | Aug. 2, 1949 |